United States Patent [19]

Comroe et al.

[11] Patent Number: 5,313,654
[45] Date of Patent: May 17, 1994

[54] METHOD FOR TRANSFERRING A PRIVATE CALL FROM A TRUNKING COMMUNICATION SYSTEM TO A CELLULAR COMMUNICATION SYSTEM

[75] Inventors: Richard A. Comroe, Dundee; Gary W. Grube, Palatine, both of Ill.

[73] Assignee: Motorola, Inc., Schaumburg, Ill.

[21] Appl. No.: 608,874

[22] Filed: Nov. 5, 1990

[51] Int. Cl.$^5$ .......................... H04B 7/26; H04Q 7/00
[52] U.S. Cl. ................................ 455/33.1; 455/34.1; 455/54.1; 455/56.1; 379/59
[58] Field of Search ...................... 455/33, 34, 53, 54, 455/56, 76, 89, 33.1, 33.4, 34.1, 34.2, 54.1, 54.2, 56.1; 379/59, 60, 63

[56] References Cited

U.S. PATENT DOCUMENTS

| 4,802,235 | 1/1989 | Treatch | 455/76 |
| 5,003,629 | 3/1991 | Ness-Cohn et al. | 455/54 |
| 5,020,093 | 5/1991 | Pireh | 379/59 |
| 5,058,199 | 10/1991 | Grube | 455/15 |

Primary Examiner—Reinhard J. Eisenzopf
Assistant Examiner—Chi Pham
Attorney, Agent, or Firm—Timothy W. Markison

[57] ABSTRACT

In a geographic region that contains a trunking communication system and a cellular communication system, wherein the coverage area of each system substantially overlaps, a method that transfers a private call from the trunking communication system to the cellular communication is disclosed. When a communication unit initiates a private call in the trunking communication system, it transfers its affiliation from the trunking communication system to the cellular communication system. Once affiliated with the cellular communication, the private call is placed to the second communication unit. The trunking communication system detects the private call and instructs a second communication unit to transfer its affiliation to the cellular communication system. Once both communication units are affiliated with the cellular communication system, the private call is conducted. Once the private call ends, both communication units transfer their affiliation back to the trunking communication system.

8 Claims, 2 Drawing Sheets

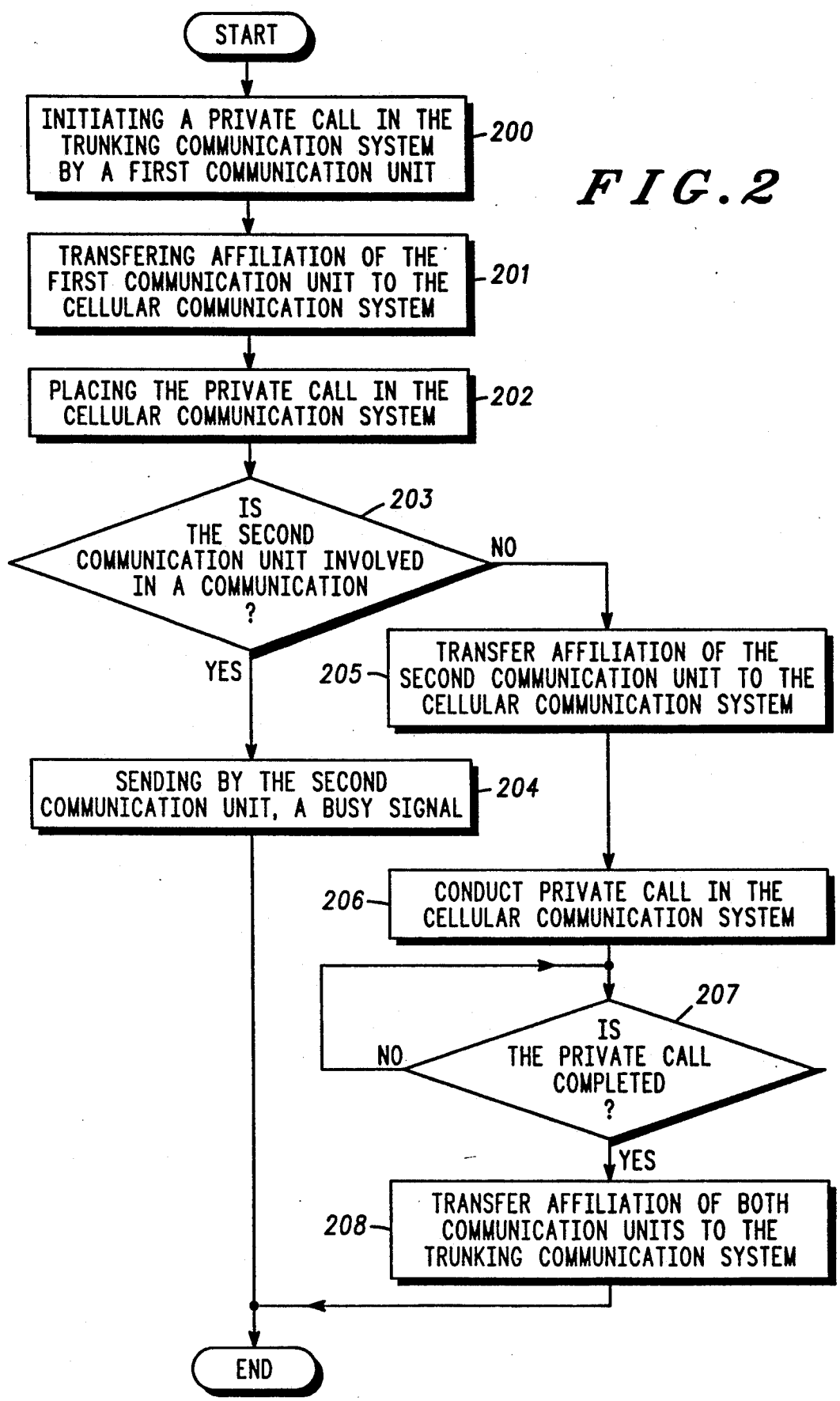

METHOD FOR TRANSFERRING A PRIVATE CALL FROM A TRUNKING COMMUNICATION SYSTEM TO A CELLULAR COMMUNICATION SYSTEM

TECHNICAL FIELD

This invention relates generally to communication systems and in particular to a method that allows a trunking communication system to utilize a cellular communication system to place private calls.

BACKGROUND OF THE INVENTION

The basic operation and structure of trunking communication systems and cellular telephone communication systems (cellular communication systems) are known. Trunking communication systems typically comprise a communication channel controller, a limited number of repeaters that transceive information via communication channels, and a plurality of communication units which may be mobile vehicle radios and/or portable radios. Of the communication channels, one is typically chosen to be a control channel. The control channel typically transceives operational information between the communication channel controller and the plurality of communication units such that, for example, the plurality of communication units can access the communication channels. Typically, the trunking system has a relatively large geographic coverage area, depending on the environment that the trunking communication system is located, the coverage area may be approximately thirty-five miles in diameter.

A cellular communication system typically comprises a mobile telephone switching office (MTSO), a plurality of cells, a limited number of communication channels, and a plurality of communication units which may be cellular telephones. Each of the plurality of cells comprises some of the limited number of communication channels, wherein one of the communication channels is designated as the control channel for that cell. The control channel transceives operational information between the plurality of communication units within the cell and the MTSO such that the communication units can place telephone calls via a phone system. Typically, the coverage area of each cell is relatively small in comparison with that of a typical trunking communication system. For example, a typical cell coverage area is approximately two miles in diameter. Because an individual cell coverage area is relatively small, the communication channels may be reused, at least once, with in a geographic region of approximately the same size as a trunking communication system.

Due to the different configurations of trunking communication systems and cellular communication systems, each communication system has certain advantages with respect to the other. For example, a trunking communication system, with its relatively large coverage area, efficiently handles group calls. (A group call comprises several communication units accessing one of the communication channels to communicate with each other.) When a particular communication unit within the trunking communication system desires to place a private call, where a private call is a point to point communication between two communication units, the efficiency of trunking communication system's communication channel allocation is dramatically reduced. Communication channel allocation efficiency of a communication system may be generally defined as the communication system's ability to service the greatest number of communication units with a limited number of communication channels in a given geographic area.

In cellular communication systems, the opposite is true. A cellular communication system is relatively efficient at accommodating private calls due to the small coverage area of the cells and geographic reuse of communication channels. Group calls over a large geographic area in the cellular communication system is relatively inefficient because, assuming that the communication units of the group call are randomly distributed throughout the geographic region, several communication channels would be needed; one communication channel for each cell that has a member of the group within it. Therefore, a need exists for a method that allows a trunking communication system to take advantage of the communication channel efficiency of the cellular communication system for private calls.

SUMMARY OF THE INVENTION

These needs and others are substantially met by the private calling in a multi-mode communication system disclosed herein. In a geographic region that contains a trunking communication system and a cellular communication system, wherein the trunking communication and the cellular communication system have overlapping coverage areas, wherein the trunking system is operably coupled to the cellular communication system, and wherein at least some communication units are affiliated with the trunking communication system, a method for placing a private call by a first communication unit to a second communication unit is presented. The method comprises the steps of initiating, by the first communication unit, a private call in the trunking communication system. Once the private call is initiated, the first communication unit transfers its affiliation from the trunking communication system to the cellular communication system. After the first communication unit is affiliated with the cellular communication system, the private call is placed in the cellular communication system. The private call is received by the trunking communication system via a cellular receiver, or the interconnection to the cellular communication system. The trunking communication system, in response to receiving the private call, instructs the second communication unit to transfer its affiliation to the cellular communication system if it is not an active participant in a communication within the trunking communication system. Once both communication units are affiliated with the cellular communication system, the private call is conducted in the cellular communication system.

BRIEF DESCRIPTION OF THE DRAWINGS

FIG. 2 illustrates a logic diagram that may be used to implement the present invention.

DESCRIPTION OF A PREFERRED EMBODIMENT

Figure 1:
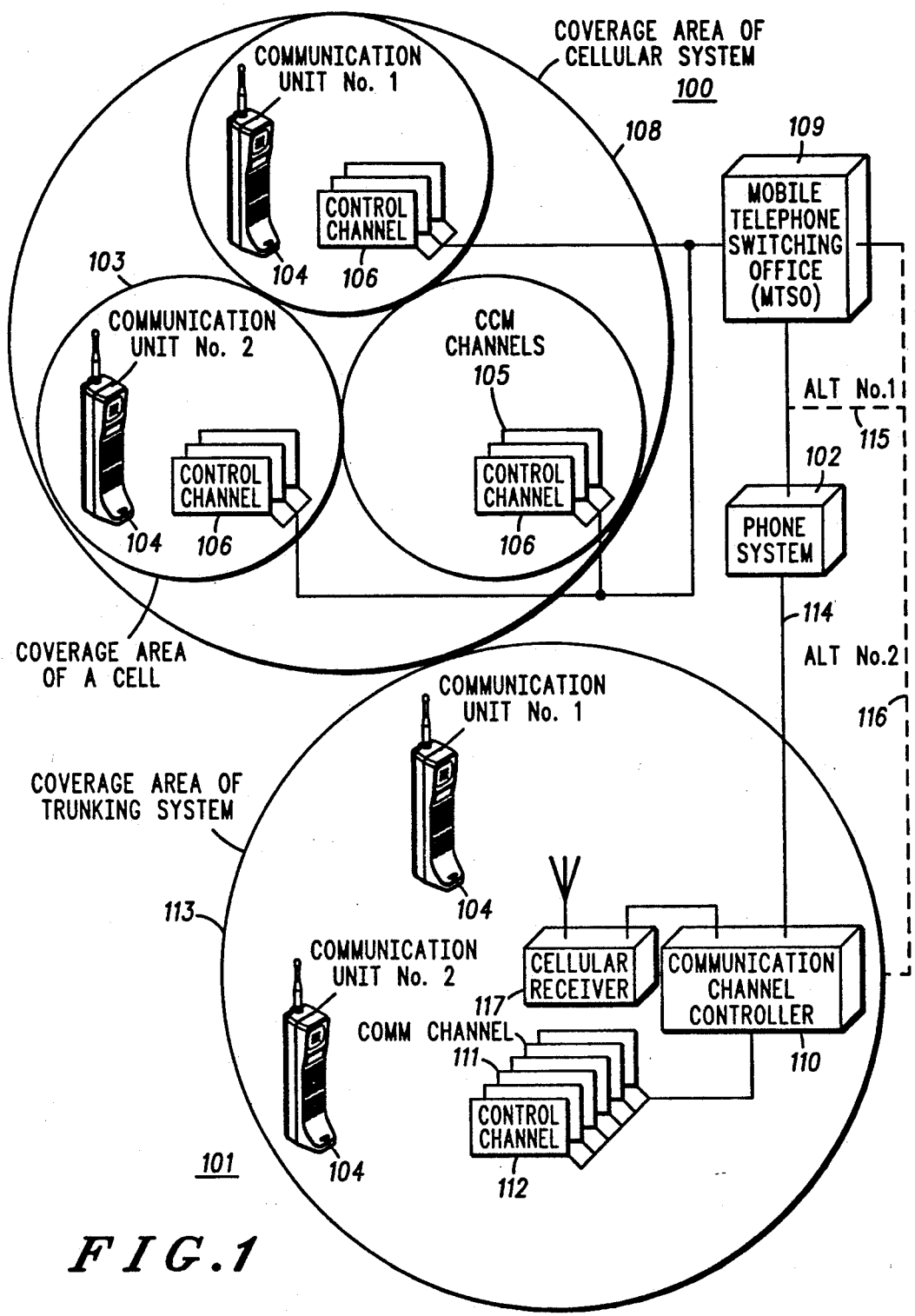
FIG. 1 illustrates a cellular communication system and a trunking communication system each having substantially the same coverage areas in accordance with the present invention.

FIG. 1 illustrates a trunking communication system (101) and a cellular communication system (100) operably coupled together in accordance with the present invention. The cellular communication system comprises a mobile telephone switching office (MTSO) (109) and a plurality of cells (103) (3 shown), where each cell is operably coupled to the MTSO (109) and has a specific coverage area (107). Each cell comprises a limited number of communication channels (105) which may be carrier frequencies, frequency pairs, and/or time division multiplexing (TDM) slots, wherein one of the communication channels is designated as a control channel. The summation of the coverage areas of each cell (107) comprises the coverage area of the cellular communication system (108). The cellular communication system also comprises a plurality of communication units (104) (2 shown) where the communication units are equipped with one receiver and one transmitter that has adequate bandwidth to operate in both the trunking communication system and the cellular communication system.

The trunking communication system (101) comprises a communication channel controller (110), a plurality of communication channels (111), wherein one of the communication channels is designated as a control channel (112), and a plurality of communication units (104). The coverage area of the trunking communication system (113) substantially overlaps and may be approximately equal to, the coverage area of the cellular communication system. (108). However, for illustrative purposes the coverage areas are shown separately. The trunking communication system further comprises a cellular receiver (117) that receives operational information from the cellular communication system and conveys it to the trunking communication system.

The trunking communication system (101) is operably coupled to the cellular communication system by one of three methods. The first and most convenient method, especially when the communication systems are manufactured by different manufacturers, is to couple the systems together through a phone line (114) or a plurality of phone lines to a phone system (102). This coupling method allows the trunking communication system to transfer messages to the cellular communication system by placing telephone calls to the cellular communication system via the telephone system (102). A alternative method is to directly connect the communication channel controller (110) to the MTSO (109) by a direct connection (116). Finally, if the communication systems are manufactured by the same manufacturer, or an agreement exists between the manufacturers, the communication channel controller (110) may be directly coupled into the communication channel links (117) of the cellular communication system by a coupling link (115) that is similar to a telephone link.

Generally, in accordance with the present invention, communication units are affiliated with the trunking communication system by monitoring the trunking communication system's control channel. When a user of a particular communication unit initiates a private call, the particular communication unit transfers its affiliation from the trunking communication system to the cellular communication system. Once the particular, or first, communication unit is affiliated with the cellular communication system, the private call is placed as a cellular telephone call. The trunking communication system, either through the phone connection to the cellular communication system or through the cellular receiver, receives the cellular telephone call page and deciphers it to determine the second communication system. (A telephone call page informs the recipient of a telephone call, for example, ringing of a telephone.)

An information packet is placed on the control channel of the trunking communication system to inform the second communication unit that it should transfer it affiliation to the cellular communication system. Once the second communication unit is affiliated with the cellular communication system, the private call can take place. After the private call ends, both communication units transfer their affiliation back to the trunking communication system. Note that when a communication unit is affiliated with the trunking communication system, it acts as trunking communication system radio, and when it is affiliated with the cellular communication system, it acts as cellular telephone.

FIG. 2 illustrates a logic diagram of the present invention. At step (200) a private call is initiated by a first communication unit in a trunking communication system. Initiation of a private call may be accomplished as if the communication unit were a cellular telephone by dialing a particular telephone number, or may be accomplished by a private call feature of a trunking communication system radio. Once the private call is initiated (200), the first communication unit transfers its affiliation from the trunking communication system to the cellular communication system (201). Transferring affiliation to the cellular communication system may be accomplished by changing a local oscillator of a receiver and a transmitter of the communication unit such that the communication unit is now operable in the cellular transmit and receive bands as opposed to the trunking transmit and receive bands. Transferring affiliation back to the trunking communication system is accomplished in a similar manner except that the local oscillator is adjusted such that the communication unit is operable in the trunking transmit and receive bands. Once the communication unit is affiliated with the cellular communication system, the private call is placed via the cellular communication system (202). The private call is placed in the cellular communication system as any other telephone call.

The trunking communication system receives the private call either via the cellular receiver or the interconnection between the cellular communication system. Once the trunking communication system deciphers the private call to determine the trunking identification number of the second communication unit, it determines whether the second communication unit is involved in a communication within the trunking communication system (203). (The communication channel controller comprises a database which stores the cellular communication system number for each communication unit and the trunking identification number for each communication unit such that when a private call is detected, the appropriate communication unit is identified.) If the second communication unit is involved in a communication (203), the trunking communication system sends a busy signal to the first communication unit. (204). The busy signal may be a typical busy signal such as is presently used by the telephone company, or a particular message indicating that the second communication unit is involved in a communication in the trunking communication system.

If the second communication unit is not involved in a communication in the trunking communication system (203), the trunking communication system transmits a private call message to the second communication unit, via the control channel, to transfer its affiliation to the cellular communication system (205). Once the second communication unit has transferred its affiliation to the cellular communication system, the private call is conducted in the cellular communication system (206). While the call is active (207), both communication units remain in the cellular communication system as cellular telephones. Once the private call ends (207), both communication units transfer their affiliation back to the trunking communication system (209). The transfer of affiliation is performed as described above. After both communication units are affiliated with the trunking communication system, the process ends.

What is claimed is:

1. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, wherein the at least one trunking communication system includes a cellular receiver that receives information from control channels of the at least one cellular communication system and transfers the information to the at least one trunking communication system, and wherein at least some of a plurality of communication units are affiliated with the at least one trunking communication system and are operable in either the at least one trunking communication system or the at least one cellular communication system, a method for placing a private call between a first communication unit of the at least some of the plurality of communication units and a second communication unit of the at least some of the plurality of communication units, the method comprises the steps of:

a) initiating, by the first communication unit, a private call in the at least one trunking communication system;
   b) transferring affiliation of the first communication unit from the at least one trunking communication system to the at least one cellular communication system;
   c) transmitting, by the first communication unit, a private call request in at least part of the at least one cellular communication system;
   d) receiving, by the at least one trunking communication system, the private call request via the cellular receiver;
   e) transferring affiliation of the second communication unit from the at least one trunking communication system to the at least one cellular communication system, when the second communication is not actively part of a communication within the at least one trunking communication system; and
   f) receiving, by the second communication unit, the private call from the first communication unit.

2. The method of claim 1 further comprises the steps of:

g) transferring affiliation of the first communication unit from the at least one cellular communication system to the at least one trunking communication system when the private call is completed; and
   h) transferring affiliation of the second communication unit from the at least one cellular communication system to the at least one trunking communication system when the private call is completed.

3. In the method of claim 1, step (e) comprises the substeps of:

e1) decoding, by the at least one trunking communication system, the private call request to at least determine identification of the second communication unit;
   e2) instructing the second communication unit to transfer affiliation to the at least one cellular communication system.

4. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system and wherein at least some of the plurality of communication units are affiliated with the at least one trunking communication system and are operable in either the at least one trunking communication system or the at least one cellular communication system, a method for a first communication unit of the at least some of the plurality of communication units to place a private call to a second communication unit of the at least some of the plurality of communication units, the method comprises the steps of:

a) initiating, by the first communication unit, a private call to the second communication unit;
   b) transferring affiliation of the first communication unit from the at least one trunking communication system to the at least one cellular communication system;
   c) placing a private call in the at least one cellular communication system between the first communication unit and the second communication unit;
   d) receiving, by the second communication unit, a private call request;
   e) transferring affiliation of the second communication unit from the at least one trunking communication system to the at least one cellular communication system, when the second communication unit is not actively part of a communication within the at least one trunking communication system; and
   f) conducting the private call in the at least one cellular communication system.

5. The method of claim 4 further comprises the steps of:

f) transferring affiliation of the first communication unit from the at least one cellular communication system to the at least one trunking communication system when the private call is completed; and
   g) transferring affiliation of the second communication unit from the at least one cellular communication system to the at least one trunking communication system when the private call is completed.

6. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, wherein the at least one trunking communication system includes a cellular receiver that receives information between control channels of the at least one cellular communication system and the at least one trunking communication system, and wherein at least some of the plurality of communication units are affiliated with the at least one trunking communication system and are operable in either the at least one trunking communication system or the at least one cellular communication system, method for a communication channel controller of the at least one trunking communication system to process a private call between a first communication unit of the at least some of the plurality of communication units and a second communication unit of the at least some of the plurality of communication units, the method comprises the steps of:

a) receiving, by the communication channel controller, a request for a private call from the first communication unit to the second communication unit;

b) transferring affiliation of the first communication unit from the trunking communication system to the cellular communication system; and c) transmitting a transfer affiliation message to the second communication unit, such that the first communication unit transmits, via the at least one cellular communication system, a telephone call page of the second communication unit.

7. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, wherein the at least one trunking communication system include a cellular receiver that receives information between control channels of the at least one cellular communication system and the at least one trunking communication system, and wherein at least some of a plurality of communication units are affiliated with the at least one trunking communication system and are operable in either the at least one trunking communication system or the at least one cellular communication system, a method for a first communication unit of the at least some of the plurality of communication units to place a private call to a second communication unit of the at least some of the plurality of communication units, the method comprises the steps of:

a) initiating, by the first communication unit, a private call to the second communication unit;

b) transferring affiliation of the first communication unit from the at least one trunking communication system to the at least one cellular communication system;

c) placing the private call in the at least one cellular communication system between the first communication unit and the second communication unit;

d) detecting, by the cellular receiver, the private call;

e) signalling, by the at least trunking communication system, the second communication unit to transfer its affiliation from the at least one trunking communication system to the at least one cellular communication system, when the second communication unit is not actively part of a communication within the at least one trunking communication system; and f) conducting the private call in the at least one cellular communication system.

8. The method of claim 7 further comprises the steps of:

g) transferring affiliation of the first communication unit from the at least one cellular communication system to the at least one trunking communication system when the private call is completed; and h) transferring affiliation of the second communication unit from the at least one cellular communication system to the at least one trunking communication system when the private call is completed.

* * * * *